Nov. 19, 1957 W. M. PERRY ET AL 2,813,637
SHINGLE TAKE OFF AND STACKER
Filed June 24, 1952 5 Sheets-Sheet 1
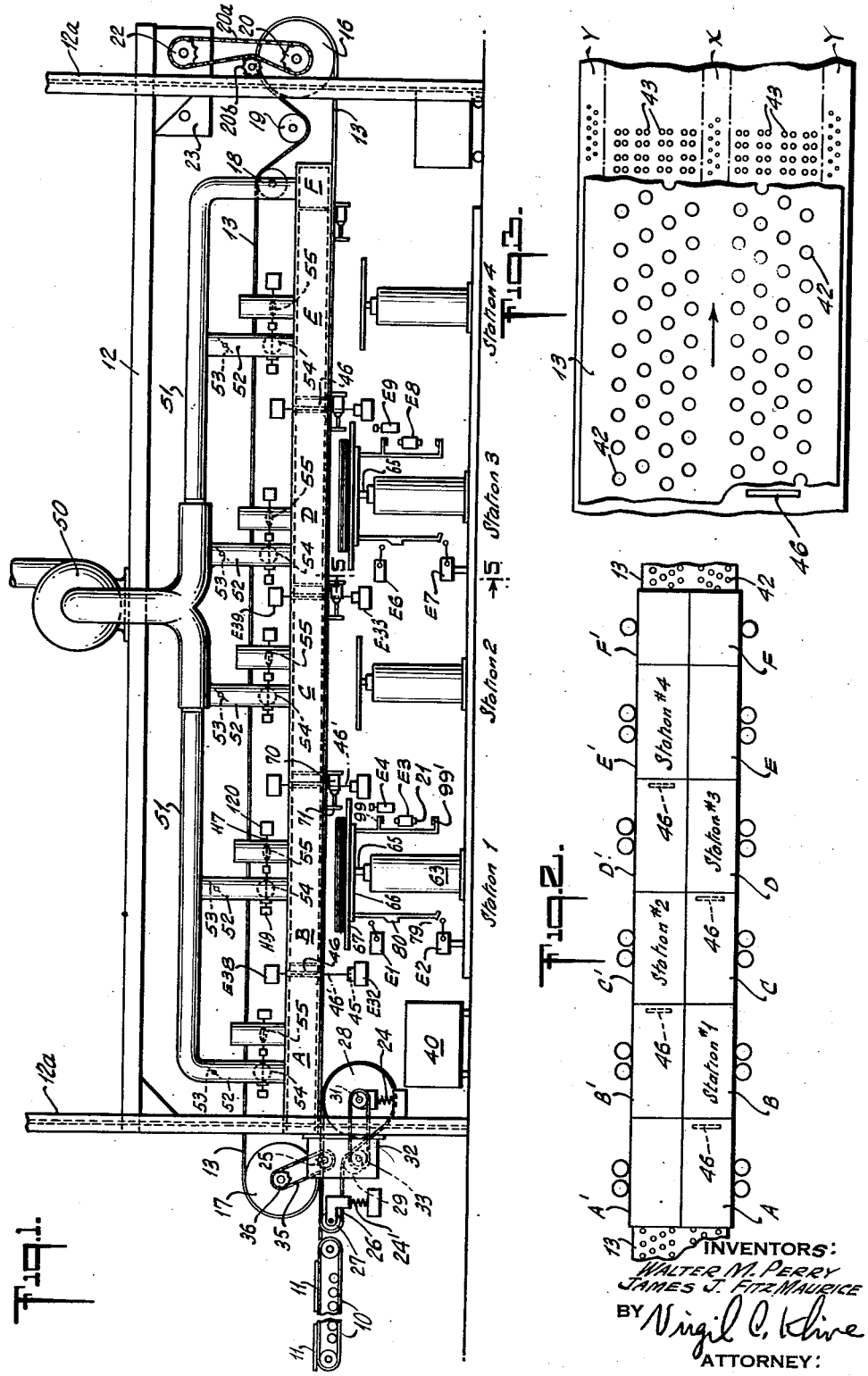
INVENTORS:
WALTER M. PERRY
JAMES J. FITZMAURICE
BY Virgil C. Kline
ATTORNEY.

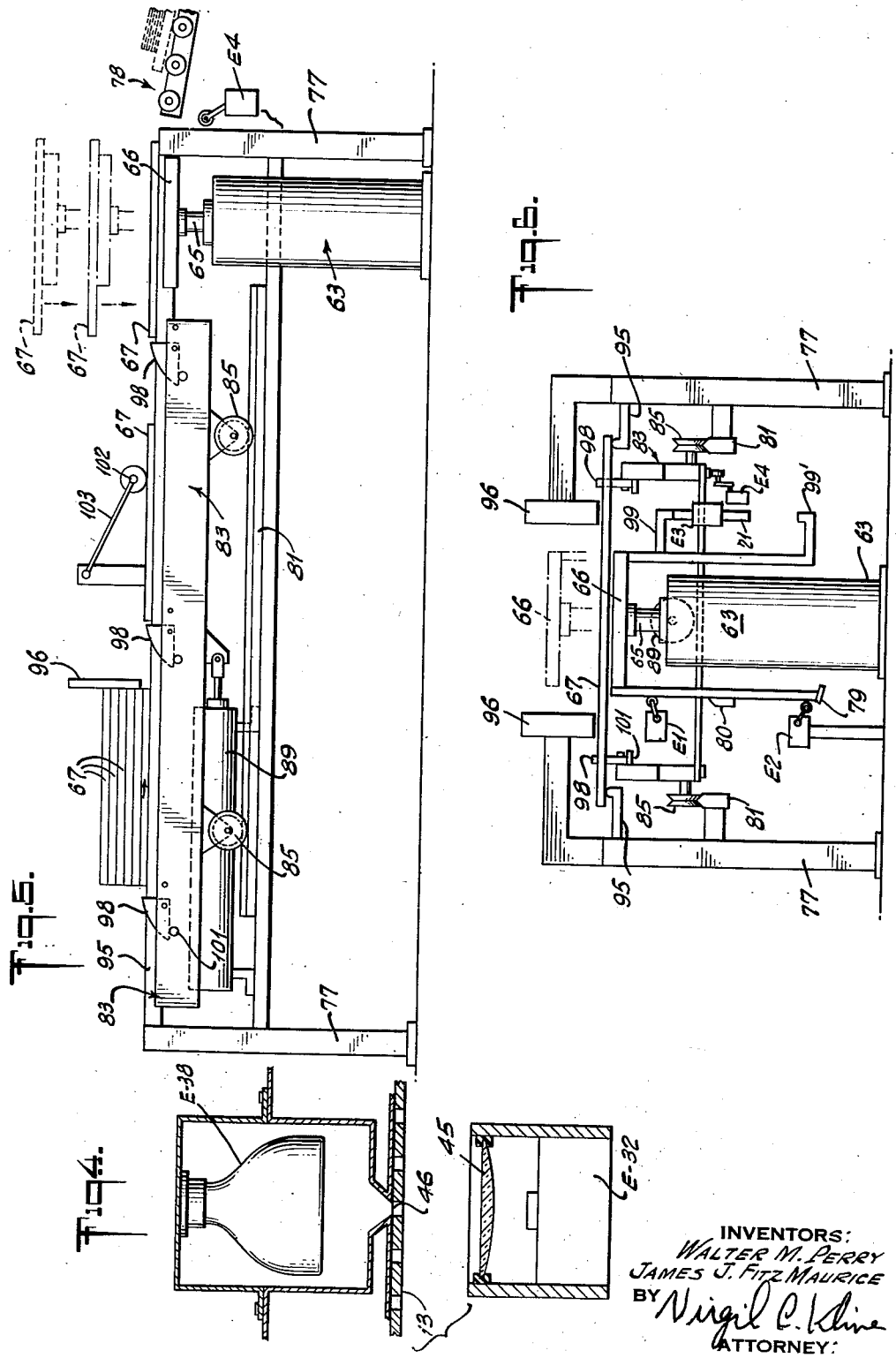

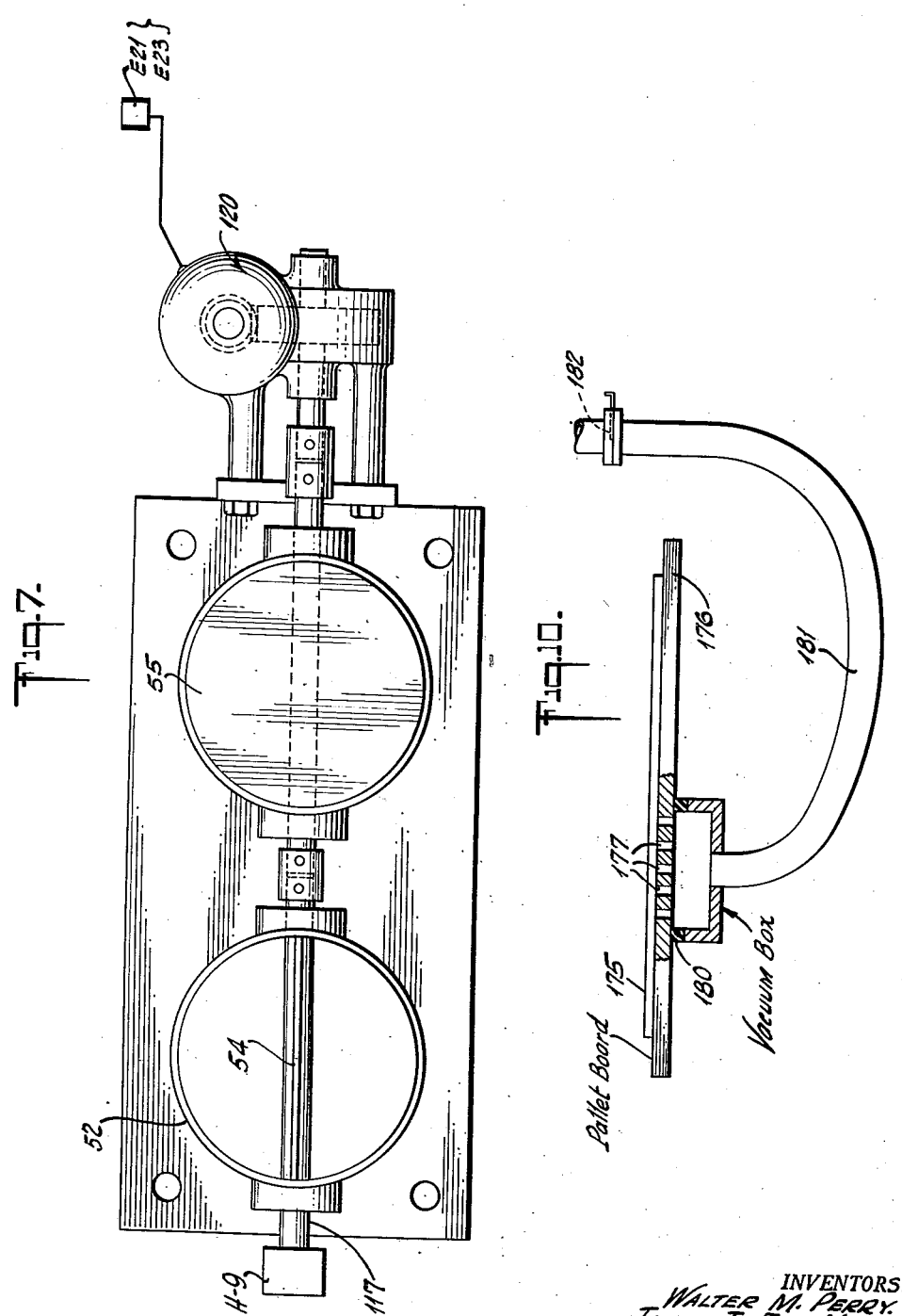

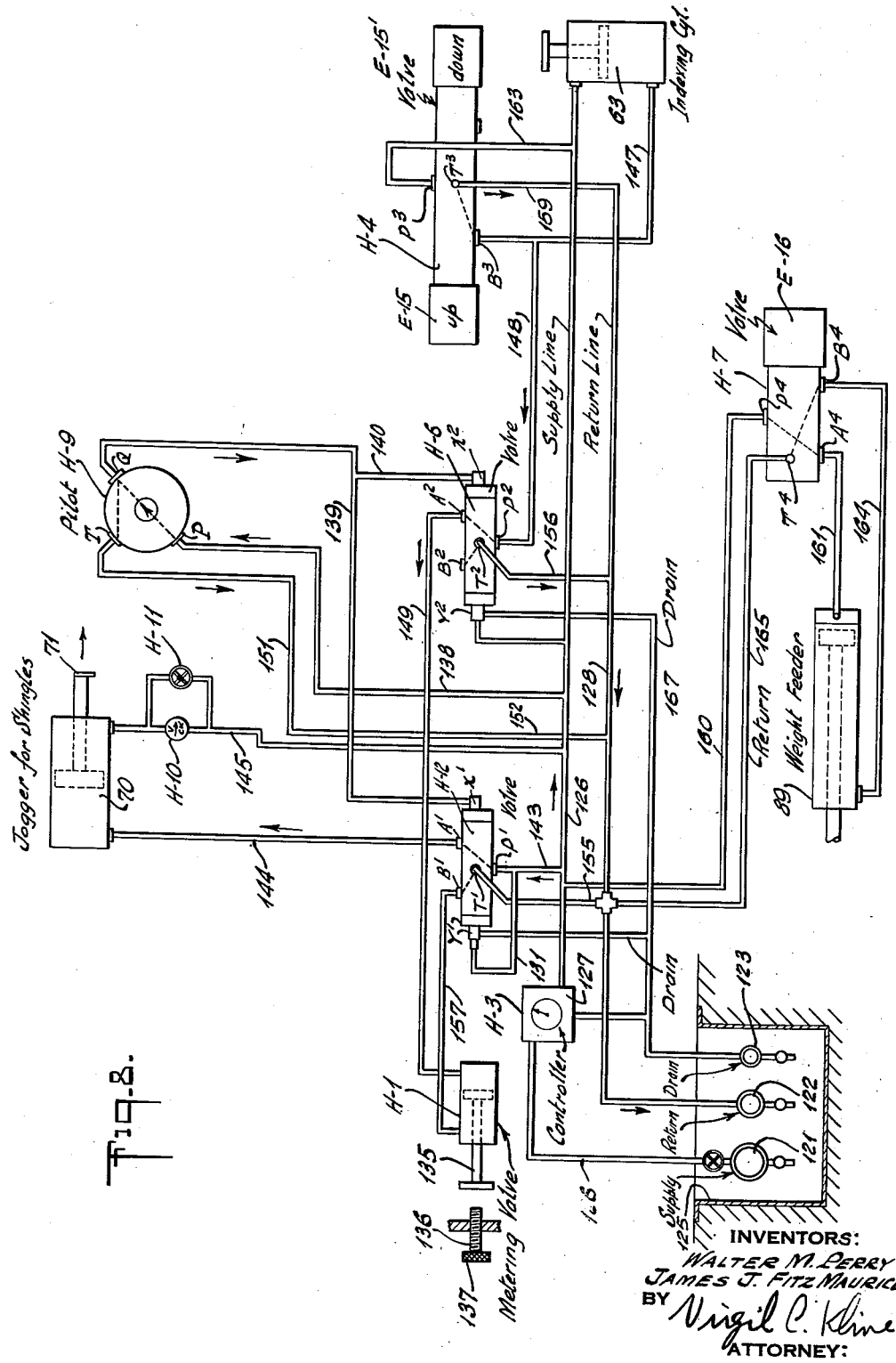

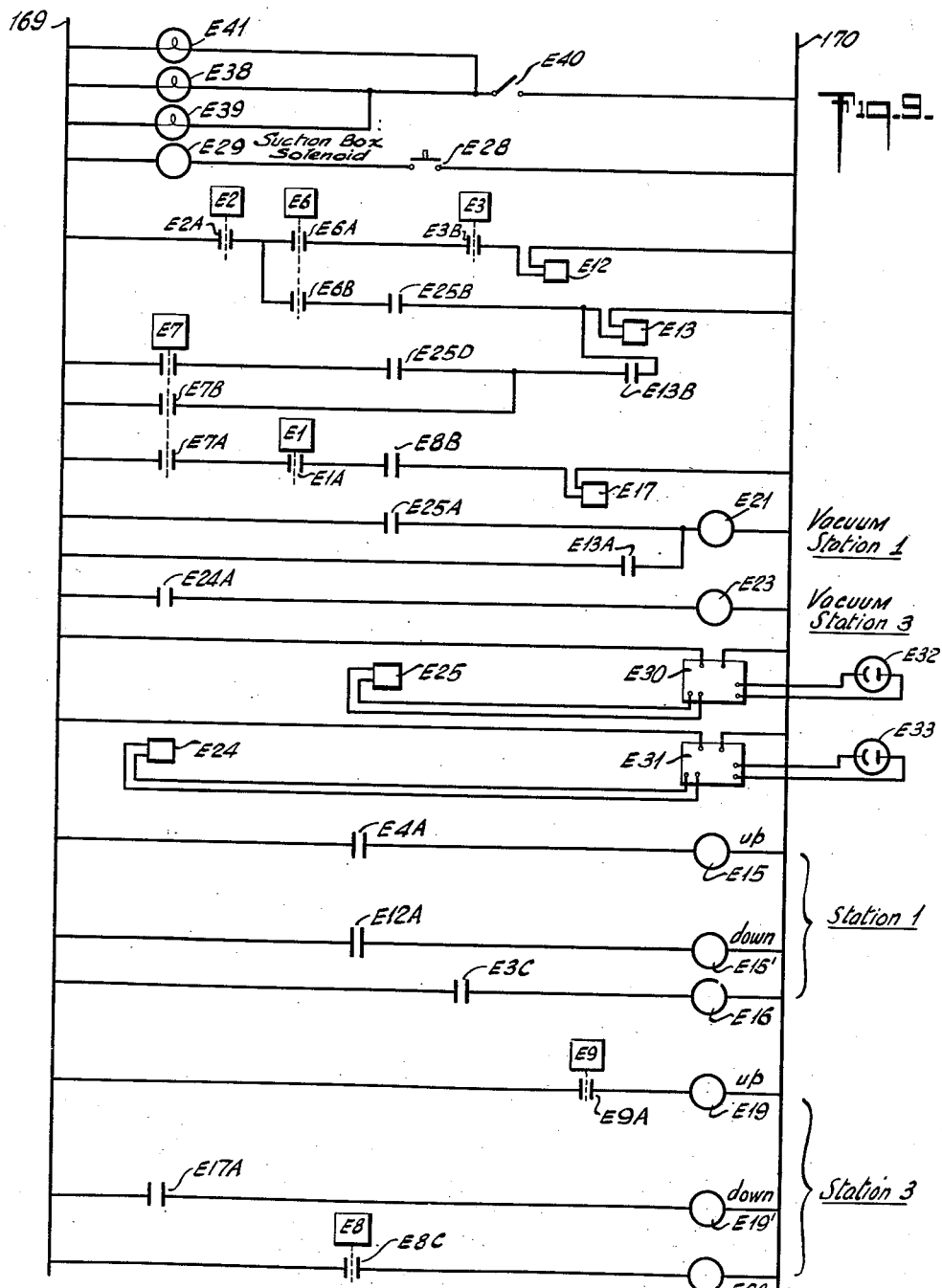

United States Patent Office 2,813,637
Patented Nov. 19, 1957

2,813,637

SHINGLE TAKE OFF AND STACKER

Walter M. Perry, Darien, Conn., and James J. Fitz-Maurice, Trenton, N. J., assignors to Johns-Manville Corporation, New York, N. Y., a corporation of New York Application June 24, 1952, Serial No. 295,256

22 Claims. (Cl. 214—6)

This invention relates to the handling and stacking of fragile sheets, and is particularly concerned with improvements in method and apparatus for mechanically handling and stacking uncured asbestos-cement shingles and sheets.

Heretofore asbestos-cement shingles and sheets have been removed from the conveyor belt of the forming machine by hand. This is a laborious operation, requiring high skill and besides often causing damage to the product it also definitely limits the speed at which the forming machine can be operated. The hand operation also limits the size, as well as the thickness of the sheet that can be successfully handled.

A primary object of the present invention is to provide method and apparatus for mechanically handling and stacking fragile sheets in such a manner that the rate of production of such sheets may be considerably increased, as compared to prior conventional practice, and whereby manual operations are largely eliminated, while holding to a minimum the breakage or marring of such sheet material.

Another object is to provide method and apparatus which are adapted for automatic transport and stacking operations on green uncured asbestos-cement sheets of greatly enlarged surface area as compared with any handled by conventional practice, without breaking or deforming said sheets.

With the above and other objects and features in view, the invention consists in the improved sheet handling and stacking method and apparatus which is hereinafter described and more particularly defined in the accompanying claims.

Among the more specific features of the present method and apparatus are the following: a perforate carrier belt passing under associated compartmentalized vacuum boxes whereby green asbestos-cement shingles or other fragile sheets may be successively transported between a transfer station and alternately one of two aligned stacking stations; periodically registering apertures in the carrier belt and in the suction faces of certain compartments of the vacuum boxes abutting the carrier belt of such design and arrangement as to make it possible to automatically control application and release of suction to the shingle or other sheet blank at the selected stacking stations; automatic actuating mechanism and automatic control means for making and breaking vacuum at the stacking stations; vertical indexing and stack straightening mechanism at each stacking station, with automatic controls for their operation; means for removing a completed stack and preparing for the reception of a new stack at each stacking station; and actuating mechanism and automatic controls for initiating the stacking operation at one stacking station in properly timed relation to discontinuance of a stacking operation at the other stacking station, so as to provide continuous stacking without interruption.

In the following more detailed description reference will be made to the attached illustrative drawings, in which:

Fig. 1 is a diagrammatic side elevation of the entire machine;

Fig. 2 is a diagrammatic plan view of the compartmentalized suction box showing the various stacking stations and the positions of the vacuum control valves;

Fig. 3 is a fragmentary bottom plan view on an enlarged scale showing a portion of the bottom of one of the vacuum boxes and a portion of the perforated conveyor belt;

Fig. 4 is an enlarged view in vertical section showing one of the photoelectric cells in proper position relative to the perforate suction conveyor and the associated light source;

Fig. 5 is a diagrammatic side elevation of the sheet collecting station and the pallet feeding and unloading mechanism;

Fig. 6 is an end elevation of the sheet collecting and pallet feeding equipment shown in Fig. 5;

Fig. 7 is an enlarged view in side elevation of the vacuum control valves and actuating mechanism therefor;

Fig. 8 is a schematic diagram of the valves, cylinders, and pipe connections for a hydraulic actuating system for controlling the operation of the equipment;

Fig. 9 is an electric wiring diagram showing the principal automatic control switches, relays, and solenoids; and, Fig. 10 is a diagrammatic view of an additional feature or accessory which may be utilized for stopping stacked articles in a desired predetermined position.

The sheet handling and stacking method forming the subject of the present invention as practiced using the apparatus which is portrayed in the drawings is particularly designed for, and adapted to, the transportation, handling and stacking of moist green uncured asbestos-cement sheets and shingles, as a preliminary to a final cure-hardening treatment.

Referring to Fig. 1 of the drawings, numeral 10 designates an endless conveyor belt which may be of conventional type and which conveys the shingles or other articles to be stacked from the manufacturing process. Normally the articles are carried on the conveyor 10 in two continuous lines, and, as previously pointed out, in the past the articles have been manually taken off this conveyor and stacked by hand in piles. The machine of this invention automatically removes the articles 11 from conveyor 10, transfers them to desired predetermined stacking points, and automatically stacks them in uniform piles, all having the same number of articles in them. The machine automatically stacks each pile on a board or pallet and the uniform stacks are automatically discharged from the machine, and each time a stack is discharged, a substitute board or pallet is automatically fed to the machine for the next stack. Duplicate rows of stations are provided for handling the two lines of shingles.

In Fig. 1 the machine comprises a transverse structural member 12 supported on uprights 12a, and endless perforated conveyor belt 13 running over rollers 16 and 17 mounted at the ends of the machine, the tension in the belt being maintained by idler rollers 18 and 19. Roller 16 is the drive roller and is driven by variable speed motor 23 through sprockets 22 and 20 and a connecting chain 20a, which passes over tensioning idler sprocket 20b.

At the intake end of the machine there is provided a transfer conveyor 26, running over rollers 27 and 28, the purpose of which is to transfer the articles from conveyor 10 to the main suction conveyor 13. Transfer conveyor 26 must be driven at the same speed as conveyor 13. This is accomplished by providing sprocket 36 on the shaft of conveyor roll 17 and driving chain 35 to sprocket 25 on gear box 32. Spur gears in gear box 32 serve to reverse the direction of rotation of drive sprocket 33, which in turn drives sprocket 31 on the shaft of conveyor roll 28. Roll 28 drives belt 26 and idler 29 maintains suitable tension. Rolls 27 and 28 are resiliently mounted on springs 24' and 24, respectively, to prevent jamming of the conveyors in the event of one article inadvertently being on top of another as they enter the gap between conveyors 13 and 26.

Perforate conveyor 13, as portrayed in Fig. 1 overlies the delivery end of transfer conveyor 26, and is in turn overlain by a compartmentalized suction box with several vacuum compartments or chambers, shown also in Fig. 2. Chambers designated respectively, A, B, C, D, E, and F overlie the right half of the perforate lower span of conveyor 13, as viewed from the intake end of the machine or as viewed from the left hand end in Figs. 1 and 2. In normal operation a vacuum is maintained constantly in chamber A, and such vacuum develops suction at the apertured suction face of chamber A, overlying the perforate lower span of belt 13. Similar compartments or chambers overlying the other half of the perforate lower span of conveyor 13 are shown at $A^1$, $B^1$, $C^1$, $D^1$, $E^1$, and $F^1$, Fig. 2. These compartments cooperate in handling the second line of shingles, stacking of which takes place at stations #2 and 4, but since this side of the machine operates identically with the first side, detailed description will be limited to the construction and operation of the first side, namely that involving stations #1 and 3.

The design and relative spacing and alignment of perforations 42 in the belt 13 and of apertures 43 in the suction face of the suction box, Fig. 3, are provided to develop a sufficient number of registering perforation holes and apertures of suitable area to impart adequate suction to lift the shingle off conveyor 26, and to hold it to the lower span of belt 13. This design is also such as to maintain uniform and adequate suction independent of any tendency of the belt to weave slightly during normal operation.

Satisfactory results have been obtained using a perforate suction belt 13 having perforations 42 of circular cross-section, approximating ½" diameter and with 1¼" center-to-center spacing both longitudinally and transversely. The corresponding apertures 43 may be circular with a diameter of approximately 5/16", or may be in the form of slots.

The ½" perforations in belt 13 are arranged in rows extending generally transversely of the belt but set at a slight angle with regard to the width of the belt. Transversely extending elongated slots 46 are provided in vertical alignment in the top and bottom of the suction box immediately ahead of each stacking station and its associated vacuum compartment partition to permit light from light sources to pass through the belt and impinge on electric eyes to actuate the sheet-dropping mechanisms. These slots are preferably designed approximately ¼" wide x 4½" in length, and preferably lie in line with the midpoint of the crosswise width of a sheet 11. Since the ½" holes are on a diagonal, there is always at least part of one hole somewhere over the slot, insuring a constant light passage to the eyes until obstructed by a sheet.

The 5/16" apertures in the bottom of the suction box are arranged in longitudinal and transverse rows with a spacing about ½" between apertures in a row. The longitudinal rows of apertures 43 are disposed in a series of three or four closely spaced rows (½" spacing) with a wider spacing of about 2½" between adjacent series of closely spaced longitudinal rows. During operation, only about 17% of the apertures 43 are in register at one time with holes 42 in the suction belt.

As best illustrated in Fig. 3, there are non-perforated strips along the center line of belt 13 and along each lateral edge thereof. Each of these non-perforate strips is wide enough to cover a double row of 13/32" diameter apertures spaced ⅜" apart in the suction faces of partitioned-walled flues Y which border all overlying vacuum compartments A to F and $A^1$ to $F^1$. The longitudinal flues Y over these non-perforate belt strips are connected to vacuum compartments in which there is a constant vacuum, and serve the purpose of holding all portions of the belt in close contact with the suction faces of all vacuum compartments, even at the stacking stations. As a further aid in keeping the belt from sagging between compartments E, $E^1$, and roller 16, constant vacuum is maintained in compartments F and $F^1$. With this constant vacuum arrangement to support the belt, it is possible to handle large sheets with this equipment, by providing the proper automatic vacuum controls for simultaneous release of vacuum, for instance, in all compartments B, $B^1$, C, $C^1$ at the same time.

Provision of a constant vacuum flue down the center of the conveyor is optional, as the two constant vacuum lines at the outer edge have been found sufficient to support the belt.

After a sheet 11 has been thus picked up by the conveyor 13, it is carried forward by the conveyor towards one of the two stacking stations 1 and 3 located respectively in vertical alignment beneath vacuum compartments B and D. In the drawings, corresponding stacking stations 2 and 4 are shown as located beneath compartments $C^1$ and $E^1$ on the other side of the machine (see Fig. 2).

Vacuum is developed in each of the vacuum compartments A, B, C, D, E, and F, and $A^1$, $B^1$, $C^1$, $D^1$, $E^1$, and $F^1$, by the operation of an exhauster fan 50 having its intake duct 51 connected by exhauster tubes 52 to each of the vacuum compartments. The degree of vacuum developed in each compartment is under the control of dampers 53 in each exhauster tube. In the normal operation of the apparatus illustrated with two lines of shingles, constant vacuum is maintained in each of compartments A, C, E, F, and $A^1$, $B^1$, $D^1$, and $F^1$, since the shingles must always be held by the belt when they pass under compartments A, C, $A^1$, $B^1$, and $D^1$, and since constant vacuum at E, F, and $F^1$ is desirable to help support the belt. However, provision is made in the form of a cut-off damper 54 located in the exhauster tube to each of chambers A and $A^1$ whereby vacuum may be momentarily broken in such chambers manually by the operator by closure of a damper control switch E28 controlling solenoid actuator E29, to allow defective sheets to be released from the suction face of the conveyor 13 below vacuum compartments A and $A^1$ for scrapping in scrap collection box 40.

Suitable valves are provided for each vacuum compartment overlying a vacuum station, both to balance the vacuum to the proper amount for each compartment, and also to cut the vacuum on and off as required for stacking. Such vacuum make and break valves for the stacking stations are double butterfly valves 54 and 55 connected for simultaneous operation, with one valve 54 in suction tube 52 to make or cut off the vacuum, while the other valve 55 is positioned to vent the compartment to the air to kill the vacuum rapidly.

The electrical operation of the vacuum controlled valves is such that at a stacking station at the instant that the forward edge of a sheet 11 interrupts a light beam $46^1$, which is indicated by a dot-dash line in Fig. 1, the vacuum controlled valve 54 opens, vent valve 55 simultaneously closes, and a vacuum is established in this compartment. This vacuum then supports sheet 11 as it progresses forward across the face of the compartment.

This light beam, when uninterrupted, extends from a light source E38 through aperture slot 46 in the lower suction face of, for instance, compartment B, thence through one or more registering perforations in belt 13, and through a lens 45 which focuses the beam on a photoelectric cell E32. Breaking of vacuum within compartment B is initiated by the passing of the trailing edge of sheet 11 beyond the beam of light, thus permitting the beam to activate cell E32, which in turn controls the operation of the double butterfly valves 54 and 55 through suitable actuating mechanism.

The advance speed of the belt 13 is such that the sheet 11 travels some distance beyond the light beam before its release to fall by gravity the short intervening space between conveyor 13 and the top of the underlying stack at the first stacking station. Usually the momentum of the released sheet is such that it travels an inch or two beyond the farther edge of the stack, and for this reason means are provided in the form of a hydraulic cylinder actuated pusher 71 for straightening the stack after each addition of a sheet thereto.

Simultaneously with the dropping of a shingle on the top of the stack, the stacking mechanism is activated to lower the stack by the thickness of a shingle or sheet, and the pusher 71 is activated to square the stack. After a stack of shingles has been collected at stacking station 1, this station is automatically cut out of the circuit, and stacking begins at station 3. During the period of stacking at station 3, vacuum is continuously maintained in compartment B overlying station 1.

The equipment provided for stacking at each stacking station is the same, and accordingly only one set of equipment will be described, namely that at stacking station 1 underlying compartment B. Referring to Fig. 6, this equipment includes an hydraulic cylinder 63 within which is a piston attached to an upwardly extending ram 65 on which is mounted a supporting platform 66. The platform 66 in turn supports a pallet 67 on which a stack of sheets 11 is built. At the beginning of a cycle, cylinder 63 is actuated to raise the platform 66 and pallet 67 to a position centered laterally with respect to compartment B and spaced a distance about 2" below the bottom surface of belt 13. Thus, when the first sheet of a stack is carried by the belt to this stacking station, on automatic breaking of the vacuum in compartment B, the sheet drops by gravity a distance of about 2" before contacting the supporting surface of pallet 67. This slight drop has been found insufficient to damage the sheet, despite its inherent fragile structure. Cylinder 63 is provided with an automatic mechanism, energized by the photo-electric cell E32 for lowering the ram supported platform 66 and the pallet supported sheet stack thereon, a distance approximately the thickness of a sheet, after each addition of a sheet to the top of the stack. This gradual lowering or indexing of the stack continues until a predetermined number of sheets as accumulated in the stack, for example 15 sheets. When the accumulation of a stack has been completed at the first stacking station, an electric limit switch E2 is closed. This switch operates to render inactive the mechanism controlling vacuum breaking in chamber B, with the result that sheets are carried by belt 13 past chamber B to stacking station 3 underlying chamber D, where the next stacking operation is to take place.

After the switch E2 has operated to transfer the stacking operation from the first to the third stacking station, station 1 is ready to be unloaded. A short time interval is necessary for the last shingle 11 to land on the top of the stack at station 1 and be centered on the stack by pusher 71. This time interval is obtained by providing a limit switch E6 operated by an actuator on the ram 65 of station 3. Switch E6 is actuated after two or three shingles have been stacked on station 3, thus automatically providing a sufficient time interval.

Figs. 5 and 6 illustrate the equipment which is provided for unloading a stack of sheets and for replacing the unloaded stack with an empty pallet preparatory to again raising the stack supporting table to its position immediately below the belt underlying compartment B, after which a new stacking operation will start just prior to completion of a stacking operation at stacking station 3.

Attached to each stacking station there is provided equipment for unloading a stack, but since this equipment is the same for each station, only that illustrated for stacking station 1 will be described. This equipment is positioned to operate transversely to the direction of travel of the belt 13, in a plane underlying the belt. Essentially the equipment portrayed in Figs. 5 and 6 includes a reciprocal carriage 83 actuated by a stationary hydraulic cylinder 89. Carriage 83 is mounted on wheels 85 which ride on rails 81 which in turn are mounted on frame 77. The side members of the carriage are spaced apart sufficiently to straddle platform 66. Also mounted on frame 77 are two guide rails 95 which are so positioned that a pallet 67 can slide forward on these rails and will just clear platform 66 when the ram is in its lowest position. Carriage 83 is equipped with three pairs of dogs 98, at spaced intervals along each side of the carriage. These dogs project slightly above rails 95 in order to engage the pallet 67 during the forward stroke.

Immediately above rails 95 is mounted a hopper, defined by retaining elements 96, which contains a stack of spare pallets 67, which are retained in stack form by the retaining elements. As the carriage moves to the right one pair of dogs 98 engages the lowest pallet in the spare pallet stack and advances the pallet to the right to a position under weighted roller 102, which is mounted on hinged arm 103, attached to the main frame. During this forward stroke another pair of dogs 98 have moved the pallet which was in position under the roller 102 to a position directly above platform 66. Simultaneously, the third pair of dogs 98 move loaded pallet 67 which was positioned above platform 66 on to gravity discharge conveyor 78.

When the piston of the cylinder 89 makes its return stroke and moves carriage 83 to the left, dogs 98 tip somewhat forward and, because of the curvature of their upper surface on a reduced radius, pass under pallet 67 which is held down by roller 102 so that the dogs do not materially disturb the pallet's position on the return stroke. Similarly dogs 98 tip forward and pass under all pallets in hopper 96. The weight of the dogs is sufficient to cause them to tilt back against stops 101 bringing the faces of the dogs vertical after they have passed under pallets 67 during the reverse stroke.

When the carriage reaches the end of its outward stroke to the right it engages limit switch E4 which in turn causes platform 66 to rise, lifting an empty pallet 67 into the uppermost position to receive a new stack of sheets.

The electrical control and hydraulic actuating elements for automatic operation of each of the various stacking stations are similar, and are arranged for timed activation and deactivation to provide continuous operation, with synchronized shifting between stations. Each stacking ram 65 carries a number of limit switch actuators. Limit switch E2 is actuated by actuator 79, which operates the switch when a predetermined number of shingles has been collected in a stack on the ram supported stacking platform. The vertical position of switch E2 is adjustable to vary the number of shingles stacked. Limit switch E1 is actuated by actuator 80 which is so placed that this limit switch operates when the ram has moved down a distance corresponding to the thickness of two or three shingles below its uppermost position.

Limit switch E3 has a plunger 21 which remains fixed in either upper or lower position. As the ram moves down, actuator 99 causes plunger 21 to snap down just before the ram reaches the bottom of its stroke. When the ram moves upwardly and just approaches the top of its stroke, actuator $99^1$ causes plunger 21 to snap up. Limit switches E1, E2, and E4 are spring-return type, and limit switch E3 is push rod maintained contact type. The limit switches for station 3 are numbered differently than for 1 as shown in Fig. 1. On station 3, E1 is numbered E6, E2 is numbered E7, E3 is numbered E8, and E4 is numbered E9.

The double butterfly valves 54 and 55 (Fig. 7) which control making and breaking of vacuum within each of the vacuum chambers overlying stacking stations (for example, chamber B and D) have been shown as having coupled actuating shafts powered by a conventional twoway air engine 120 of the type used commercially on industrial windshield wipers, having its air supply under the control of solenoid operated air valve E21 (see Fig. 9) for station 1. Engine 120 serves to rotate the butterfly valves so that one is always open when the other is closed, the engine being shown as connected to the valve shaft through a rack and pinion. A hydraulic pilot valve H9 is directly connected to the valve shaft, and its primary function is to effect lowering of the stacker platform and operation of the straightening pusher 71 each time a shingle is dropped on the top of the stack.

The hydraulic system

Referring now to Fig. 8, this figure shows the complete hydraulic system with the connections to the various hydraulic cylinders and the various control valves utilized. This figure shows the previously described indexing cylinder 63, the hydraulic jogger cylinder 70, and the hydraulic pallet feeder cylinder 89. The hydraulic system will be described for station 1 corresponding to the previous description, but it will be understood that the description applies equally for station 3, and also for stations 2 and 4 in the other line.

Fig. 8 shows the hydraulic pilot valve H9, this valve as previously described being a two-position valve actuated by the shaft 117 of the butterfly valves. The valve H9 has ports P, T, and Q and, as indicated, in one position of the valve, the ports P and Q are connected and in the other position the ports T and Q are connected.

The hydraulic cylinders 63, 70, and H1 are of the differential type wherein the piston has a stem of a size in a predetermined ratio to the area of the opposite side of the piston.

The system is based on known principles of operation wherein a supply of hydraulic liquid such as oil is provided under pressure and the valves are operated in a manner as to supply oil to the pistons in such a manner as to provide the desired mechanical motion of the piston rod. The hydraulic system includes a supply main 121, a return main 122, and a supplementary return drain 123 which is used for valve drainage. Main 121 is connected to a supply header 126 through a metering device 127 which controls the rate of supply of hydraulic fluid to each part of the system. A return header 128 connects to main 122.

H12 designates the usual commercial type of two-position pilot operated spool valve in which the spool and therefore the port positions are controlled by hydraulic pressure on opposite ends of the spool. This valves has ports $A^1$, $B^1$, $T^1$, $P^1$ and the connections to the operating spool are indicated as $X^1$, and $Y^1$. When pressure is applied to the connection $X^1$, the spool moves to the left, and this connects port $P^1$ to port $A^1$ and port $B^1$ to port $T^1$. When pressure is released from the connection $X^1$, the pressure through pipe 131 to connection $Y^1$ moves the spool in the opposite direction and this connects port $P^1$ to port $B^1$ and port $A^1$ to port $T^1$. Valve H6 is similar to H12 except that port $B^2$, corresponding to port $B^1$, is plugged.

H4 designates a conventional double ended plunger type valve which is electrically operated by solenoids E15 and $E15^1$. The plunger of this valve normally assumes a mid-position when neither of the solenoids is energized. It has three ports $B^3$, $P^3$, and $T^3$ and when the solenoid E15 at one end is energized port $B^3$ is connected to port $P^3$, and when the solenoid $E15^1$ at the other end is energized, the port $B^3$ is connected to port $T^3$. When the valve plunger is in its mid-position, ports $B^3$ and $P^3$ are blocked, and flow through the valve is stopped.

H7 designates a conventional two-position hydraulic valve operated by solenoid E16. This valve has ports $A^4$, $B^4$, $P^4$ and $T^4$. In one position of the valve port $A^4$ is connected to $P^4$ and port $B^4$ to $T^4$ and in the other position these connections are reversed, that is, the connections are $A^4$ to $T^4$ and $B^4$ to $P^4$.

H1 designates a metering cylinder which controls the amount by which the cylinder 63 indexes down each time an article is stacked. H1 has a piston rod 135 and its stroke is determined by the position of an adjusting screw 136. By controlling the stroke of 135 it is possible to control the amount of hydraulic fluid which can enter cylinder H1 on the right side of the piston, and thus the amount of fluid which escapes from below the piston of cylinder 63 and thereby the amount by which this cylinder indexes down.

Referring to station 1 of the machine, when the vacuum is released in vacuum box B, it drops an article at station 1, the stem 117 of the flapper valve actuating the pilot valve H9 to the position wherein the ports P and Q are connected. When this happens, oil from the header 126 is supplied to port P of valve H9, to port Q, and thence through pipes 139 and 140 to the connections $X^1$ and $X^2$ of the valves H12 and H6. The plungers in these valves move to the left, connecting ports $P^1$ and $P^2$ to ports $A^1$ and $A^2$, respectively, and ports $B^1$ and $B^2$ to ports $T^1$ and $T^2$, respectively. Under these circumstances the jogger cylinder 70 operates to straighten up the pile of articles and the cylinder 63 indexes downwardly one increment.

The supply of hydraulic fluid to the cylinder 70 is from header 126 through pipe 143 to port $P^1$ and thence to port $A^1$ of valve H12 and thence through pipe 144 to the left side of the piston in cylinder 70. The piston in cylinder 70 operates to the right with a slow, gentle motion so as not to injure the articles, this action being by virtue of the check valve H10 in pipe 145 connecting to the right side of the piston in cylinder 70. Character H11 designates a needle valve in parallel with the check valve H10.

It will be observed that the flow of fluid through valve H4 is prevented during these operations because its plunger is spring-held in its mid-position, in which ports $B^3$ and $P^3$ are blocked. It will also be observed that the chamber below the piston in cylinder 63 is connected to port $P^2$ of valve H6 by pipes 147 and 148. The connection is completed through port $A^2$ and pipe 149 to the right side of the piston in metering cylinder H1. This piston operates to the left an amount determined by the adjustment of screw 137 which determines the amount of hydraulic fluid admitted to the cylinder and this determines the amount that cylinder 63 indexes downwardly.

When the vacuum is now put on vacuum chamber B by virtue of another article passing beneath it and across the light beam, pilot valve H9 operates to its opposite position wherein its port T is connected to port Q. This releases pressure from connections $X^1$ and $X^2$ of the valves H12 and H6 by virtue of these connections now being connected to port Q, and port T, and by way of pipe 151 and pipe 152 to the return line 128. The spools in the valves H12 and H6 now move to the right by reason of the pressure on connections $Y^1$ and $Y^2$ through their connections to the supply line, whereby the ports $P^1$ and $P^2$ are connected to the ports $B^1$ and $B^2$, respectively, and the ports $A^1$ and $A^2$ to the ports $T^1$ and $T^2$, respectively. Connection $Y^2$ is normally connected to line 126 as shown. A quick return stroke now comes about in the cylinder 70 since the right side of the piston is connected to supply line 126 and the left side of the piston is connected to the return line by way of the pipe 144, the ports $A^1$ and $T^1$ and pipe 155 connecting to return line 128. The hydraulic fluid on the right side of the piston in H1 now drains back to the return line through the pipe 149 to port $T^2$ and through pipe 156 to return line 128. Hydraulic fluid is supplied to the left side of the piston in H1 through the pipe 143, ports $P^1$ and $B^1$, and the pipe 157. Between the above-described downward indexing operations of the piston in the indexing cylinder 63, the piston remains in its indexed position, since the plunger in valve H4 is in its mid-position, in which ports B³ and P³ are blocked off, thus preventing flow through the valve.

When a predetermined number of articles have been collected at station 1, for example fifteen articles, as will be described presently, it is necessary that the indexing cylinder 63 drop to its lowermost point for unloading the stack of articles and feeding the next pallet. This is accomplished by energizing the solenoid E15¹ of the hydraulic valve H4 which connects the ports B³ and T³ of the valve H4. Thus the chamber below the piston in cylinder 63 is connected through pipe 147 to port B³ and thence through port T³ and the pipe 159, the connection is made to the return line 128. Since the pressure is released below the piston, it drops to its lower-most position.

When this occurs, electrical circuits are completed as will be described in connection with the electrical operation which energizes solenoid E16 of hydraulic valve H7. This causes port P⁴ to be connected to port A⁴ and hydraulic pressure is supplied to the right side of the piston in cylinder 89 causing it to make a forward stroke. The supply of hydraulic fluid is through pipe 160. Fluid is released from ahead of the piston in 89 through pipe 164, ports B⁴ and T⁴, and pipe 165 to return line 128. After the feeder cylinder 89 has operated, circuits are completed, as will be described, which energize the solenoid E15 at the other end of hydraulic valve H4. The plunger in H4 now moves to the opposite position connecting ports P³ and B³. Hydraulic pressure then is applied to both the upper and lower sides of the piston in cylinder 63, and because the area of the lower face of the piston is greater than the upper face, the ram rises to the top of its stroke where it assumes the collecting position. At this point E15 is de-energized and the valve plunger springs to its central position in which ports P³ and B³ are blocked. When solenoid E16 is de-energized, connections in H7 are reversed which causes the piston in cylinder 89 to retract.

167 designates a drain line for carrying off any excess hydraulic fluid caused by linkage in control 127 and connections Y¹ and Y².

*Over-all operation including electrical operation*

There are two separate or independent electrical systems, one for stations 1 and 3; the other, for stations 2 and 4. Since their operation is identical, only one has been illustrated (Fig. 9) and will be described in detail, namely, that for stations 1 and 3.

Referring to Fig. 9, the nomenclature is as follows:

Limit switches which are located at stacking stations 1 and 3 have previously been identified as E1, E2, E3, E4, E5, E6, E7, E8, and E9.

E16 is the operating solenoid for hydraulic valve H7 for station 1, and E20 is the corresponding solenoid for station 3. E15 is one operating solenoid for hydraulic valve H4 and E15¹ the other. E19 for station 3 corresponds to E15, and E19¹ corresponds to E15¹.

E38 is the photo-electric light source for station 1 and E39 for station 3. E32 is the photo-electric cell for station 1 and E33 for station 3. E30 is the photo-electric relay for station 1 and E31 for station 3. E25 is a relay operated by E30 for station 1, and E24 is a corresponding relay for station 3. E21 is a solenoid operated air valve for station 1 and E23 a similar solenoid valve for station 3. E12, E13, and E17 are magnetically-operated control relays.

The over-all operation of the machine will now be described with particular reference to the interlocking electrically controlled circuits whereby full automatic operation is obtained. Reference is made particularly to Fig. 9 showing an electrical wiring diagram of the control circuits. Fig. 9 shows diagrammatically the various limit switches operated by the hydraulic cylinders of stations 1 and 3 and their contacts. It also shows the electrical solenoids of the electrically operated valves in the hydraulic systems of stations 1 and 3. The operation will be described with reference to stations 1 and 3 in order to illustrate the interlocking relationship whereby stacking shifts from one station to another. The operation will be described starting with the indexing cylinders of these two stations in their up position and with no articles stacked on them.

In Fig. 9 the electrical wiring is shown in the form of a single circuit supplied with power from the lines 169 and 170, across which an appropriate operating voltage is provided. E40 represents a manual switch controlling power to a pilot light E41 which indicates that power is on the light sources E38 and E39 of stations 1 and 3.

In the operation the motor 23 is started to drive the main conveyor belt 13 at appropriate speed and the suction blower 50 is put in operation for producing vacuum in the various vacuum chambers. Now, when the leading edge of a shingle is carried by the main conveyor belt 13 approaching vacuum box B, so as to break the light beam through slot 46, the photo-electric cell E32 actuates the photo-electric relay E30 and the relay E25 (see Fig. 9). Relay E25 closes its contact E25A which energizes the vacuum solenoid E21, operating the butterfly valves at station 1 in the manner previously described to establish the vacuum at station 1 so that the shingle is not dropped as it moves under compartment B. The butterfly valve shaft simultaneously actuates the hydraulic pilot valve H9 in the manner described above, and the metering cylinder rod 135 moves to the right on its return stroke and the rod of the jogger cylinder 70 backs up in position to receive a shingle.

When the shingle passes slot 46, and the light beam is re-established, the photo-electric cell E32 de-actuates photo-electric relay E30 and relay E25, causing contact E25A to open, which de-energizes solenoid E21, operating butterfly valves at station 1 to break the vacuum in box B so that the shingle is dropped on to pallet 67 on platform 66 of indexing cylinder 63 at station 1. The butterfly valve shaft simultaneously operates the hydraulic pilot valve H9 as described before, rod 135 moves to the left and the indexing cylinder 63 indexes down one increment and the pusher 71 makes a slow forward stroke to straighten the stack. Time lags in the system are such that the shingle falls and slides up to the face of the pusher before its stroke gets underway. After two shingles are dropped actuator 80 releases limit switch E1, closing contacts E1A, which normally initiates the dropping of platform 66 at station 3 to its unloading position, but as station 3 is up ready to receive shingles, in which position contacts E7A of limit switch E7 are open, nothing will happen, as will be apparent, even though contacts E8B are closed as a result of station 3 platform's being in the up position.

Platform 66 of station 1 continues to index downward as more shingles are collected until limit switch E2 is operated and held by its actuator, thus indicating that a predetermined count (15 or more) has been reached, whereupon contacts E2A close. Because station 3 platform is in the up position, limit switch E6 is being held actuated, so that contact E6A is open and E6B is closed. Now, if and only when vacuum exists at station 1 (showing that a shingle is breaking the light beam at this station), relay contacts E25B will close to pick up relay E13. E13 locks itself in through contacts E13B and E7B, E7B being closed when platform 66 at station 3 is up and not indexed down far enough to operate limit switch E7. Contact E13A closes in E21 circuit and locks that solenoid in. Now, regardless of the opening and closing of the photo-relay contacts as shingles make and break the light beam, vacuum is maintained continuously at station 1 and the shingles will pass to station 3 for collection. Locking in the vacuum solenoid E21 also causes station 1 cylinder 63 to be stopped and held at the position at which it actuated limit switch E2.

At station 3 the shingles make and break the vacuum through photo-relay E31 and relay E24 and vacuum solenoid E23. When about two shingles have been collected at this station, its cylinder 63 has dropped enough to cause the actuator 80 to release limit switch E6. Although this opens contact E6B, relay E13 remains locked in. Contact E6A closes and energizes relay E12 (contacts E2A and E3B are closed, the push rod 21 of switch E3 not yet having been actuated downwardly by actuator 99).

Contact E12A closes and energizes E15$^1$ which causes platform 66 of station 1 to drop rapidly to its unloading position, as described under hydraulic controls. When it reaches bottom, actuator 99 operates push rod 21 of limit switch E3. Contact E3B opens to de-energize relay E12 which stops and holds the platform 66 in position (with both solenoids of valve H4 de-energized and therefore all valve ports blocked). Contact E3C also closes when push rod 21 is operated by actuator 99 to energize solenoid E16 of valve H7 and the carriage 83 moves forward to remove the loaded stack of shingles and substitute an empty pallet 67. The carriage remains in the forward position because contact E3C will remain closed until actuator 99$^1$ operates push rod 21 of switch E3 as platform 66 returns to its upper-most position.

At the end of its stroke carriage 83 operates and holds limit switch E4. Contact E4A closes to energize solenoid E15 of valve H4 and platform 66 rises to its uppermost position. During this upward travel limit switch E2 is released, but although contact E2A opens, relay E13 remains locked in by closed contact E7B, and constant vacuum continues to be maintained at station 1, while shingle collection continues at station 3. The actuator 80 also operates and holds limit switch E1 with contact E1A open near the end of the stroke, but relay E17 is not affected because it is already inactive by reason of being locked out by contact E7A, which is open until the platform 66 at station 3 has dropped far enough to actuate the switch E7.

At the end of the upward stroke of the platform 66 actuator 99$^1$ operates the plunger 21 of E3. Contact E3C opens to de-energize solenoid E16 and carriage 83 retracts. Limit switch E4 is released by the carriage and contact E4A opens to de-energize solenoid E15. This holds the platform 66 in its collecting position. Contact E3B also closed and partially sets up relay E12 circuit for the next operation of limit switches E2 and E6.

Meanwhile, shingles are still being collected at station 3. When approximately 13 shingles have been collected, the platform has dropped sufficiently to operate and hold limit switch E7. Contact E7B opens in relay E13 circuit. Now, if and only when contacts E25D are open (showing that vacuum exists at station 1), the circuit to relay E13 is broken and it drops out. Contact E13A opens to remove the holding circuit for solenoid E21. Now when the trailing edge of the shingle at station 1 clears the light beam, the vacuum will be broken and this shingle and the following ones are collected at station 1. There will still be one or two uncollected shingles moving along the section of belt between stations 1 and 3. Limit switch E1, which controls the dropping of station 3, is located so that there is sufficient time for these shingles to be collected at the station before the platform is dropped to unload.

When limit switch E1 is released by its actuator, contact E1A closes to energize relay E17, since both E8B and E7A are now closed. Contact E17A closes and energizes solenoid E19$^1$ which drops platform 66 at station 3 to its unloading position. When it reaches bottom the actuator operates limit switch E8. Contact E8B opens to de-energize relay E17 which stops and holds the platform in position. Contact E8C also closes to energize solenoid E20 and carriage 83 of station 3 makes a forward stroke. At the end of this stroke the carriage actuates and holds limit switch E9. Contact E9A closes to energize solenoid E19 and raise platform 66 of station 3.

In rising, the actuator releases limit switch E7, opening E7A and closing E7B, and also actuates limit switch E6, opening E6A and closing E6B, but as in the case of station 1 platform, this has no effect. Opening of E7A has no effect because E8B in that circuit is open anyway. Closing of E7B has no effect because E13 and E13B are presently out of that circuit. Opening E6A and closing E6B have no effect because E2A is still open. Therefore, relays E12 and E13 remain presently inactive, so that constant vacuum is not maintained at station 1 and it continues through the stacking cycle until interrupted by the actuation of limit switch E2. At the end of its upward stroke the platform actuator operates limit switch E8 in the opposite direction. Contact E8C opens to de-energize solenoid E20 and carriage 83 retracts. Limit switch E9 is thereby released and opens in solenoid E19 circuit to stop and hold the piston in the platform cylinder.

The stacking of shingles continues at station 1 until a full count has been collected and limit switch E2 has been operated, whereupon the shingle flow is diverted to station 3 for collection and the cycle repeats itself.

From the foregoing, those skilled in the art will observe that there has been provided a unique and fully automatic machine whereby articles such as asbestos shingles or the like are automatically taken off of a conveyor belt, transferred to another point, and stacked in even, uniform piles which are automatically discharged from the machine. The machine, furthermore, automatically feeds substitute pallets on which additional piles of articles are uniformly stacked. The arrangement and combination of parts of the machine are such as to make it extremely effective, efficient in operation, and rugged. The arrangement, whereby a vacuum is utilized to attach the articles to the conveyor belt, is very effective from the mechanical standpoint and lends itself very well to automatic control in response to photo-electric relays, with the result that the automatic control and operation are both positive and accurate so that the machine will operate effectively over long periods of time to produce the desired results with a minimum of attention from operators. The machine is therefore highly effective from the standpoint of minimizing the number of personnal required in the manufacturing and handling operations.

Various modifications may be made in the structural arrangement and control sequence as thus far described. That, is, the machine may be readily modified to handle the stacking of articles of considerably larger size, etc. For example, the machine might be modified to handle articles in the form of sheets which might be of considerable longitudinal extent in the direction of the main conveyor belt, or of considerable width, or both. As will be apparent to those skilled in the art, this rearrangement could be readily effected, the machine and its control circuits lending themselves very well to such rearrangements. In these circumstances it might be desirable to rearrange the vacuum control circuits so as to break the vacuum in two or more vacuum chambers simultaneously so as to simultaneously release the large sheet or article at all points. Thus, to accommodate two lines of longer but not wider sheets, simultaneous vacuum control might be established in pairs, respectively, for compartments B and C, B$^1$ and C$^1$, D and E, and D$^1$ and E$^1$. To accommodate one row of wider but not longer sheets, the electrical system for one side of the machine might be cut out and simultaneous vacuum control established for each of the pairs of compartments comprising that compartment overlying a station on the electrically operative side and its laterally adjacent compartment. For instance, if stations 1 and 3 were kept operative, simultaneous vacuum control could be established for the pairs of compartments B and B$^1$, and D and D$^1$, respectively, under the control of the electric eyes on the station 1 side. In this situation, constant vacuum could be maintained in compartments $C^1$ and $E^1$, as well as C and E. If sheets sufficiently greater in both length and width were to be accommodated, the operation of stations 1 and 2 might be synchronized and the simultaneous vacuum control of the operative electrical circuit (station 1 side) extended respectively to the groups of compartments B, $B^1$, C, and $C^1$, and D, $D^1$, E, and $E^1$. It will thus be clear that the machine is in no way limited to the stacking of articles of any particular size or shape nor is it limited to any one particular or exact sequence of electrical operation.

In the handling of relatively large articles in sheet form it has been found that in stacking such sheets, the first sheet will sometimes slide too far after it reaches the board or pallet on which it is to be stacked. As a result the next sheet may fall short, leaving the sheets unevenly stacked. Since it is not practical in the case of large sheets to push the first sheet back with a hydraulic pusher or jogger, an arrangement in the form of an accessory has been provided for braking, that is, controlling the sliding of the first sheet to be stacked. Such an arrangement is diagrammatically shown in Fig. 10 of the drawing. In this figure numeral 175 designates a sheet being stacked, the sheet being shown as lying on a board or platform 176. The board 176 has perforations therein as shown at 177 through which a vacuum is applied for stopping the sliding movement of sheet 175. Numeral 178 designates a vacuum box having a sponge rubber seal 180 formed around its edges for sealing engagement against board 176 around the perforations 177. A suction line 181 is connected to the vacuum box 178, and it connects to a suitable source of vacuum through an adjustable valve as diagrammatically shown at 182. The vacuum can readily be controlled in synchronism with the dropping of the sheet whereby the amount of sliding of the first sheet dropped is controlled and thus the amount of the slide can be maintained the same for the first sheet as for subsequent sheets and a uniform, even pile or stack is obtained.

The foregoing disclosure is representative of preferred forms of the invention. The invention which has been thus described by detailed example is not limited as to such details and it is to be understood that variations, changes, and modifications are contemplated within the scope of the invention as defined by the following claims.

What we claim is:

1. In apparatus for handling a plurality of articles and collecting them in groups, a pair of article collecting stations spaced from each other, means for alternately transporting the articles successively to the respective stations, means for successively collecting a plurality of said articles as thus transported at each of the respective stations, means for diverting the transportation of the succession of articles to a second one of said stations in response to the collection of a predetermined number of articles at the first station for collection of a plurality of articles at the second station, means for removing the accumulation of articles at said first station to prepare the first station for another collection operation, means for initiating the removal of the accumulation of articles at the first station by said removing means in response to the collection of a first predetermined number of articles at the second station, and means for diverting the transportation and collection of the succession of articles to the first station in response to the collection of a second predetermined number of articles, greater than the first, at the second station, after the removal of the accumulation of articles at the first station.

2. In apparatus for handling a plurality of articles and collecting them in groups, a pair of article collecting stations spaced from each other, means for alternately transporting the articles successively to the respective stations, means for initiating the successive collection of a plurality of said articles as thus transported at each of the respective stations, means for diverting the transportation and collection of the succession of articles from a first one of said stations to the second station in response to the collection of a first predetermined number of articles at the first station, means for removing the accumulation of articles at each of said stations to prepare them for another collection operation, means for initiating the removal of the accumulation of articles at the first station by the removing means at that station in response to the collection of a first predetermined number of articles at the second station, means for diverting the transportation and collection of the succession of articles from the second station to the first station in response to the collection of a second predetermined number of articles at the second station, greater than the first, and means for initiating the removal of the accumulation of articles from the second station by the removing means at that station in response to the collection of a second predetermined number of articles at the first station, less than the first, to prepare the second station for another collection operation prior to the continuation of a new cycle by diverting the transportation and collection of the succession of articles to the second station as aforesaid.

3. In apparatus for handling a plurality of articles and collecting them in stacks, a pair of article stacking stations spaced from each other, means for gripping and alternately transporting the articles successively to the respective stations, means for initiating the successive release and dropping of the articles as thus transported at each of the respective stations, stack supporting means at each of the stations for receiving the articles as dropped at the respective stations, means at each station for periodically indexing the supporting means and stack at the respective station downwardly in timed relation to the dropping of the articles, means at each station for displacing the stack supporting means and stack at the respective station laterally and for feeding a replacement stack supporting means into position at the respective station, means at each station for elevating the replacement stack supporting means to an additional stack forming position preparatory to commencement of another stacking operation at that station, means for shifting the transportation and dropping of the succession of articles from station to station in response to the accumulation of a predetermined number of articles at the then stacking station, and means for initiating the said lateral displacement of the stacks and stack supporting means and the elevation of the replacement stack supporting means at each of the respective stations during stacking at the other station.

4. In apparatus for handling and stacking sheets such as asbestos-cement shingles moving successively in a continuous line in spaced relation, a pair of alternately functioning, aligned stacking stations spaced apart from each other, means for gripping the successive sheets and advancing them successively in a line toward the said aligned stacking stations, means responsive to movement of said sheets to first and second predetermined points, respectively, by said transporting means for initiating the successive release and stacking of successive sheets at the respective stations, means for discontinuing the successive release and stacking of successive sheets at each station and initiating such sheet release and stacking at the other station in timed relation to the final stages of stacking at the station immediately stacking.

5. In apparatus for handling and stacking fragile sheets, such as uncured asbestos-cement shingles, supported in a continuous line in successive spaced relation and moving to a transfer station, a pair of stacking stations spaced apart from each other but aligned in tandem with each other and the transfer station, means for applying suction to each sheet successively at the transfer station to lift it away from its support at the transfer station and advance it in a line toward the two aligned stacking stations while held by the suction, means for successively making and breaking suction on successive sheets as they arrive at the stacking station nearer to the transfer station to release them successively for stacking at that station, means for discontinuing the successive breaking of suction at the stacking station nearer to the transfer station in timed relation to the final stages of a stack formation at that station to temporarily provide constant suction at that station, whereby the successive sheets are carried under suction past the nearer station to the more remote station, and means for successively making and breaking suction on successive sheets as they arrive at the more remote station to release them successively for stacking at that station.

6. Apparatus as defined in claim 5, and including means for removing the stack of sheets at the nearer station in timed relation to the completion of a stack formation at the more remote station, means for interrupting the constant suction at the nearer station in timed relation to the completion of a stack formation at the more remote station to initiate a new stacking operation at said nearer station by the successive making and breaking of suction on the successively arriving sheets as aforesaid, and means for removing the stack of sheets at the more remote station during such stacking at the nearer station.

7. The apparatus defined in claim 6, including means for automatically initiating stacking in the manner aforesaid at the more remote and nearer stations, respectively, each upon the stacking of a first predetermined number of sheets at the other, and means for automatically initiating the removal of the stacks from the nearer and more remote stations, respectively, each upon the stacking of a second predetermined number of sheets, less than the first, at the other, whereby the stacking and removal are automatically initiated in timed relation and performed in cyclic manner, to provide continuous stacking without interruption.

8. Apparatus as defined in claim 5, in which the means for advancing the sheets under suction to the stacking stations supports the sheets for gravity drop as released at the respective station, and including stack receiving means at the respective station having means for applying suction to the bottom of the first sheet dropped to arrest its sliding motion.

9. Apparatus as defined in claim 5, and including means at the respective stacking stations for periodically jogging the stack in response to the arrival of a sheet at a predetermined point in its advance to its respective station, to keep the sheets straight in the stack.

10. Apparatus as defined in claim 5, in which the means for advancing the sheets under suction to the stacking stations supports the sheets for gravity drop as released at the respective stations, and including stack receiving means at the respective stations closely spaced to the sheet advancing means, means supporting the stack receiving means for movement vertically, and means for lowering the stack receiving means an indexed distance approximating the thickness of a sheet in response to the arrival of a sheet at a predetermined point in its advance to its respective station.

11. In apparatus for handling and stacking a plurality of sheets being delivered in a continuous line at spaced intervals by sheet delivery means, an endless perforate belt having one end overlying the sheet delivery means, a vacuum chamber partitioned into a plurality of separate vacuum compartments, each having an apertured suction face overlying one span of the belt in tandem alignment with the others and in substantial abutting relation with said one span, means for driving the belt with its said one span in abutting relation with the suction faces, means for creating vacuum in the separate compartments, means for controlling vacuum in the separate compartments independently of each other, and means responsive to arrival of the sheets as carried by the belt at a predetermined point for controlling the vacuum in an associated compartment, whereby a sheet may be released from the belt for deposit at a station corresponding to said associated compartment.

12. In apparatus for handling and stacking fragile sheets such as uncured asbestos-cement shingles and having a conveyor for delivering the sheets continuously at spaced intervals, an endless belt having perforations through which suction may be applied, one end of one span of said belt overlying said conveyor in close proximity thereto, a plurality of adjacent vacuum compartments each having apertured suction faces overlying the length of said one span in aligned relation therewith, at least a part of one of said compartments overlying the said one end of said one span, means for maintaining constant vacuum in said one compartment to thereby lift the sheets successively from the conveyor and carry them beneath the succeeding compartments by suction through the perforations in said belt, a pair of tandemly aligned stacking stations each underlying said one span and the suction face of one of said succeeding compartments, means for automatically controlling the successive making and breaking of vacuum alternately in each of the two said succeeding compartments overlying a stacking station in response to movement of said sheets by said belt to a predetermined point traversed thereby ahead of and proximate to the respective station to thereby release said sheets successively for stacking at said station, and means for automatically switching stacking from one station to the other in response to the collection of a predetermined number of sheets at said one station, the last mentioned means including means for initiating the maintaining of constant vacuum at the stacking station nearer to the sheet delivery means in switching stacking therefrom to the more remote station.

13. Apparatus as defined in claim 12, in which each of the stacking stations includes stacking mechanism comprising a hydraulically operated platform mechanism and automatic controls for the hydraulic pressure operatively connected to the means for breaking vacuum and releasing sheets from the belt at the respective station, for indexing the platform downwardly one increment each time a sheet is stacked on the platform.

14. Apparatus as defined in claim 13, in which the means for controlling the application of vacuum at the stacking stations and the switching of stacking from one station to the other comprises air valves associated with the station vacuum compartments, means for operating the air valves, solenoid controls for said operating means, a light source and a photoelectric cell arranged to receive light from said light source through said belt and suction face at each of the respective stacking stations when a sheet is not obstructing the passage of light, relay means operatively connected to said photoelectric cells and said solenoid controls to actuate the latter to successively make and break vacuum at the stations during stacking, limit switches arranged for actuation by the dropping of the station platforms in stacking a predetermined number of sheets, said limit switches having contacts connected in interlocking electrical circuits with said solenoid controls and relay means to lock in the solenoid control at said near station to initiate constant vacuum at the nearer station and stacking at the more remote station when the station platform at the nearer station has dropped a predetermined distance in stacking a predetermined number of sheets, and to divert stacking to the nearer station upon stacking of a predetermined number of sheets at the more remote station.

15. Apparatus as defined in claim 14, in which the stacking platforms support sheet receiving pallets, and including a carriage at each stacking station, means supporting the carriage for lateral translatory movement for removing a pallet when supporting a completed stack of sheets and for substituting a replacement pallet on the platform, means for producing said lateral movement of the carriage, limit switches arranged for actuation by said platform and carriage travel and having contacts arranged in said interlocking circuits to control respectively said carriage movement and the elevation of the respective station platform to position for another stack building operation.

16. Apparatus as defined in claim 15, including means overlying a portion of said carriage for supporting a supply of pallets in a stack, said carirage having members arranged to engage the bottom pallet of the stack for removing the bottom pallet during forward translatory movement of the carriage to transfer the said bottom pallet to the station platform, and said members being retractable to inactive position upon return translatory movement of the carriage to a position to engage a new pallet for removal from the supply.

17. In apparatus for handling and stacking sheet stock, such as uncured asbestos-cement shingles, an endless belt having apertures therein, a vacuum chamber having a suction face having apertures therein and overlying one span of the belt in aligned and substantial contacting relation therewith, means for creating and breaking vacuum in said chamber, means for driving the belt with its said one span in contact with said suction face, at least a portion of the apertures in said one span and said suction face being always in communication, whereby sheets may be held to said one span by suction applied thereto and be transported therewith, a sheet receiving station beneath said apertured suction face for receiving sheets dropped therefrom when vacuum is broken thereat, said suction face having a transversely extending slot located ahead of its apertures, the arrangement of the apertures in said belt being such that at least a portion of the slot and the apertures in the belt are always in register, a light source arranged to transmit light through the slot and the registering portion of the apertures when not obstructed by the sheet, light sensitive means arranged to receive the transmitted light, and means controlled by said light sensitive means for controlling the making and breaking of vacuum in said chamber, whereby the deposit of a sheet at said sheet receiving station is automatically controlled by the travel of the sheet past the slot associated with said suction face and station.

18. In apparatus for handling and stacking sheet stock, such as uncured asbestos-cement shingles, an endless belt having apertures therein, a succession of tandemly aligned and substantially contiguous but separate vacuum chambers each having a suction face having apertures therein and overlying one span of the belt in alignment and substantial contacting relation therewith, the apertures in said belt and suction faces being arranged in transversely extending rows, the rows in said belt extending angularly with respect to the rows in said suction faces so that at least a portion of the apertures in said one span and the respective suction faces are always in register, means for creating vacuum in said chambers, means for driving the belt with its said one span in contact with said suction faces, whereby sheets may be held to said one span by suction applied therethrough and be transported therewith, means for controlling vacuum in said separate chambers independently of each other, whereby vacuum may be made or broken at selected suction faces to hold or release sheets from the belt thereat, and sheet receiving stations located respectively beneath the selected suction faces, said vacuum controlling means including, in said suction faces, slots extending transversely thereof ahead of the respective selected suction faces and angularly with respect to the rows of apertures in said belt, so that at least a portion of the slots and apertures in said one span are always in register, light sources arranged to transmit light through the slots and the registering apertures when not obstructed by a sheet, light sensitive means arranged to receive the transmitted light, and means controlled by said light sensitive means for controlling the making and breaking of vacuum in the associated chamber, whereby the deposit of a sheet at a selected station is automatically controlled by the travel of the sheet past the slot associated with that station.

19. In apparatus for handling and stacking sheet stock, such as uncured asbestos-cement shingles, an endless perforate belt, a vacuum chamber having a perforate suction face overlying one span of the belt in aligned and substantial contacting relation therewith, means for driving the belt with its said one span in contact with said suction face, means for creating vacuum in said chamber, whereby sheets may be held to said one span by suction applied therethrough and be transported therewith, sheet transfer means comprising an endless conveyor closely underlying the forward end of the perforate belt, means for continuously delivering sheets at spaced intervals to said conveyor for transfer to said belt, and means resiliently supporting said conveyor for yielding movement away from said belt to prevent jamming in the event that a plurality of sheets inadvertently are superposed when fed to said conveyor by the sheet delivery means.

20. In apparatus for conveying and stacking articles such as asbestos-cement sheets, a conveyor for advancing a sheet forwardly and delivering it by gravity drop with a forward component of motion, a stacking platform located in the path of the gravity drop of the sheet and below the point of initiation of the gravity drop, said platform having a sheet receiving surface onto which a forwardly travelling sheet is dropped, said surface being foraminous, and means for applying suction through the foraminous sheet receiving surface and thereby arresting sliding motion of the sheet as it lands thereon.

21. In apparatus for handling and stacking fragile sheets such as uncured asbestos-cement shingles and having a conveyor for delivering the sheets continuously at spaced intervals, an endless belt having perforations through which suction may be applied, one end of one span of said belt overlying said conveyor in close proximity thereto, a plurality of adjacent vacuum compartments each having apertured suction faces overlying the length of said one span in aligned relation therewith, at least a part of one of said compartments overlying the said one end of said one span, means for maintaining constant vacuum in said one compartment to thereby lift the sheets successively from the conveyor and carry them beneath the succeeding compartments by suction through the perforations in said belt, a pair of tandemly aligned stacking stations each underlying said one span and the suction face of one of said succeeding compartments, means for automatically controlling the successive making and breaking of vacuum alternately in each of the two said succeeding compartments overlying a stacking station in response to movement of said sheets by said belt to a predetermined point traversed thereby ahead of and proximate to the respective station to thereby release said sheets successively for stacking at said station, means for automatically switching stacking from one station to the other in response to the collection of a predetermined number of sheets at said one station, the last mentioned means including means for initiating the maintaining of constant vacuum at the stacking station nearer to the sheet delivery means in switching stacking therefrom to the more remote station, each of the stacking stations including stacking mechanism comprising a hydraulically operated platform mechanism and automatic controls for the hydraulic pressure operatively connected to the means for breaking vacuum and releasing sheets from the belt at the respective station, for indexing the platform downwardly one increment each time a sheet is stacked on the platform, said stacking platforms being adapted to support sheet receiving pallets, a carriage at each stacking station, means supporting the carriage for lateral translatory movement for removing a pallet when supporting a completed stack of sheets and for substituting a replacement pallet on the platform, means for producing said lateral movement of the carriage, and means responsive to respective travel of said platform and said carriage to control respectively said carriage movement and the elevation of the respective station platform to position for another stack building operation.

22. Apparatus as defined in claim 21, including means overlying a portion of said carriage for supporting a supply of pallets in a stack, said carriage having members arranged to engage the bottom pallet of the stack for removing the bottom pallet during forward translatory movement of the carriage to transfer the said bottom pallet to the station platform, and said members being retractable to inactive position upon return translatory movement of the carriage to a position to engage a new pallet for removal from the supply.

References Cited in the file of this patent

UNITED STATES PATENTS

| | | |
|---|---|---|
| 1,281,014 | Huneke | Oct. 8, 1918 |
| 1,608,930 | English | Nov. 30, 1926 |
| 1,736,935 | Navarre | Nov. 26, 1929 |
| 1,985,563 | Fitz Gerald | Dec. 25, 1934 |
| 2,065,674 | Fay | Dec. 29, 1936 |
| 2,207,782 | Carlson | July 16, 1940 |
| 2,312,357 | Odquist et al. | Mar. 2, 1943 |
| 2,341,021 | Curtis | Feb. 8, 1944 |
| 2,486,196 | Nebolsine | Oct. 25, 1949 |
| 2,492,889 | Royal | Dec. 27, 1949 |
| 2,508,861 | Jessen | May 23, 1950 |
| 2,538,972 | Magnani | Jan. 23, 1951 |
| 2,540,972 | Wagner et al. | Feb. 6, 1951 |
| 2,566,246 | Peters | Aug. 28, 1951 |
| 2,596,448 | Toronto | May 13, 1952 |